United States Patent
Troufflard et al.

(10) Patent No.: US 11,050,187 B2
(45) Date of Patent: Jun. 29, 2021

(54) ELECTRICAL CONNECTION SYSTEM

(71) Applicant: GULPLUG, Grenoble (FR)

(72) Inventors: Ronan Troufflard, Saint Egrève (FR); Amandine Bray, Grenoble (FR); Vianney Poiron, Grenoble (FR); Bruno Chazel, Voiron (FR)

(73) Assignee: GULPLUG, Grenoble (FR)

( * ) Notice: Subject to any disclaimer, the term of this patent is extended or adjusted under 35 U.S.C. 154(b) by 157 days.

(21) Appl. No.: 16/308,978

(22) PCT Filed: Jun. 12, 2017

(86) PCT No.: PCT/FR2017/051490
§ 371 (c)(1),
(2) Date: Dec. 11, 2018

(87) PCT Pub. No.: WO2017/216458
PCT Pub. Date: Dec. 21, 2017

(65) Prior Publication Data
US 2019/0312381 A1 Oct. 10, 2019

(30) Foreign Application Priority Data

Jun. 13, 2016 (FR) ...................................... 1655450

(51) Int. Cl.
*H01R 13/62* (2006.01)
*B60L 53/35* (2019.01)
(Continued)

(52) U.S. Cl.
CPC .......... *H01R 13/6205* (2013.01); *B60L 53/16* (2019.02); *B60L 53/31* (2019.02);
(Continued)

(58) Field of Classification Search
CPC .............. H01R 13/6205; H01R 13/631; H01R 2201/26; B60L 53/35; B60L 53/16;
(Continued)

(56) References Cited

U.S. PATENT DOCUMENTS 5,909,100 A * 6/1999 Watanabe ............... H02J 50/10
320/108
9,908,426 B2 * 3/2018 Fukushima ............. B60L 53/37
(Continued)

FOREIGN PATENT DOCUMENTS

DE 202010015377 11/2011
DE 202012003577 6/2012
(Continued)

*Primary Examiner* — Nha T Nguyen
(74) *Attorney, Agent, or Firm* — Occhiuti & Rohlicek LLP

(57) ABSTRACT

An electrical connector includes an outer envelope with a mechanical or magnetic guide and a first connector integrated therein. The first connector comprises a front face on the envelope, a first electrical connection unit, and a magnetic device that attracts a second connector to cause its abutment against the front face. The magnetic device electrically connects the first and second electrical connection units to a second electrical connection unit of the second (Continued)

connector. The guide, which is around the front face, guides the second connector toward the first connector to ensure magnetic joining of the first and second connectors.

21 Claims, 8 Drawing Sheets

(51) Int. Cl.
*B60L 53/16* (2019.01)
*B60L 53/31* (2019.01)
*H01R 13/631* (2006.01)
*H02J 7/00* (2006.01)

(52) U.S. Cl.
CPC ............ *B60L 53/35* (2019.02); *H01R 13/631* (2013.01); *H02J 7/0045* (2013.01); *H01R 2201/26* (2013.01); *Y02T 10/70* (2013.01); *Y02T 10/7072* (2013.01); *Y02T 90/12* (2013.01); *Y02T 90/14* (2013.01)

(58) Field of Classification Search
CPC ...... B60L 53/31; H02J 7/0045; Y02T 90/121; Y02T 90/125; Y02T 90/14; Y02T 10/7072; Y02T 10/7005
See application file for complete search history.

(56) References Cited

U.S. PATENT DOCUMENTS

| | | |
|---|---|---|
| 2006/0120461 A1 | 6/2006 | Knight |
| 2013/0076296 A1 | 3/2013 | Sadatoshi |
| 2013/0171840 A1 | 7/2013 | Wojciech et al. |
| 2013/0295781 A1 | 11/2013 | Gualino et al. |
| 2016/0005341 A1* | 1/2016 | Levinsohn ............... H04R 1/08 381/91 |

FOREIGN PATENT DOCUMENTS

| | | |
|---|---|---|
| EP | 1667459 | 6/2006 |
| EP | 2461429 | 6/2012 |
| EP | 2667459 | 4/2013 |
| EP | 2595252 | 5/2013 |
| EP | 2628213 | 11/2016 |
| JP | 2008282568 | 11/2008 |
| KR | 20150127571 | 11/2015 |
| WO | WO 2011/151696 | 12/2011 |
| WO | WO 2012/032230 | 3/2012 |
| WO | WO 2014/202849 | 12/2014 |

\* cited by examiner

ELECTRICAL CONNECTION SYSTEM

RELATED APPLICATIONS

This is the national stage, under § 371, of international application PCT/FR2017/051490, filed on Jun. 12, 2017, which claims the benefit of the Jun. 13, 2016 priority date of French Application 1655450.

FIELD OF THE INVENTION

The invention relates to an electrical connection system that provides an electrical connection between two parts by using magnetic means and to a recharging installation for an electrical device, more particularly for an electric vehicle.

BACKGROUND

It is known to have electrical connectors in which one part magnetically attracts another part to cause an electrical connection.

It is also known to use induction as a way to charge a battery, for example of an electric vehicle. However, known ways of using induction are difficult to implement on a mass scale.

SUMMARY

The invention provides an electrical connector that is useful for recharging an electric vehicle and that retains certain advantages of induction charging.

In one aspect, the invention features an electrical connection device comprising an outer envelope; a first connector that is integrated in the envelope, and has a front face on the envelope, a first electrical connection unit that is designed to be connected to an electrical supply circuit, first magnetic means to attract a second connector by means of magnetic effect such as to make a front face of the second connector adhere by means of magnetic effect against the front face of the first connector, and to connect the first electrical connection unit electrically to a second electrical connection unit of the second connector; and mechanical guide means and/or second magnetic guide means that are integrated in the envelope of the device, and are arranged around the front face of the first connector, in order to ensure exclusively guiding of the second connector towards the first connector, such as to ensure their joining by means of magnetic effect.

According to a particular feature, the mechanical guide means comprise a guide surface that extends the front face of the first connector continuously towards the exterior.

According to a particular embodiment, the guide surface has a concave form, such as to form a receptacle, and in that the first connector is integrated in the base of the receptacle.

According to a particular embodiment, the second magnetic means comprise at least one permanent magnet and/or at least one electromagnetic coil accommodated in the envelope of the device.

According to a particular embodiment, the second magnetic guide means comprise a plurality of coils with an annular form arranged concentrically relative to the first connector, and means for control of the coils.

According to a particular embodiment, the control means are configured to execute a sequence for control of the coils, comprising successive steps of activation of the concentric coils, for example from an outer coil towards an inner coil.

According to a particular embodiment, the mechanical guide means comprise at least one arm with movement that can be activated, which arm is accommodated in the envelope and supports the magnetic means.

According to a particular embodiment, the second magnetic means comprise a magnetic plastic that at least partially constitutes the envelope.

The invention also relates to an electrical connection system comprising: a first part comprising a first electrical connector that is designed to be connected to an electrical supply circuit; a second part comprising a second electrical connector that is designed to be connected to an electrical device to be supplied with power; and first magnetic means to attract the second connector by means of magnetic effect towards the first connector, such as to connect the first electrical connector electrically to the second electrical connector; the first part comprising an electrical connection device as defined above according to one of the embodiments.

The invention also relates to an installation for charging a battery of an electric vehicle, that comprises a connection system as defined above, and wherein the first part or the second part is connected to an electrical supply circuit, and, respectively, the second part or the first part is connected to a supply system of the electric vehicle.

According to a particular embodiment, the first part is placed on the ground.

According to a particular embodiment, the first part is integrated in the ground.

According to a particular embodiment, the second part comprises a cable that connects it to the supply system of the electric vehicle, and a winder that is designed to wind the cable.

According to a particular embodiment, the second part is positioned on a support such as to be raised relative to the ground.

According to a particular embodiment, the first part comprises means for displacement on the ground.

According to a particular embodiment, the displacement means comprise small wheels and a motor that is designed to drive the small wheels.

According to a particular embodiment, the displacement means comprise rails that cooperate with the small wheels.

According to a particular embodiment, the first part comprises electrical conductors that are accommodated in the rails.

According to a particular embodiment, the first part comprises a control unit and a detection unit that are connected to the control unit.

According to a particular embodiment, the second part comprises a marker that is designed to be detected by the detection unit of the first part.

BRIEF DESCRIPTION OF THE FIGURES

Other characteristics and advantages will become apparent from the following detailed description provided in relation to the appended drawings in which.

DETAILED DESCRIPTION OF AT LEAST ONE EMBODIMENT

Figure 1:
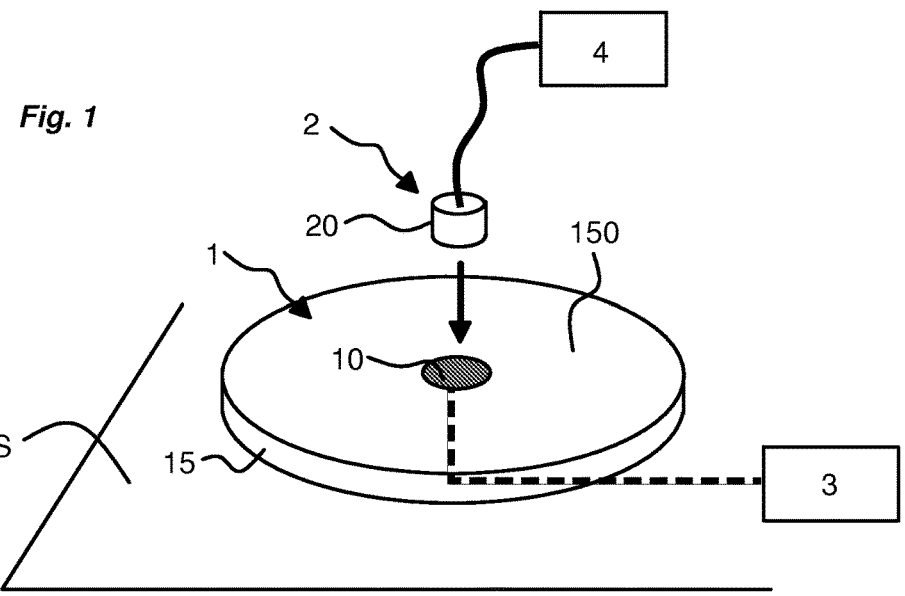
FIG. 1 represents a first embodiment of the electrical connection system.

An apparatus as described herein uses a magnetic field to join first and second connectors 10, 20.

The apparatus has a first part 1 and a second part 2. In the illustrated embodiment, the first part 1 connects to an electrical supply 3 and the second part 2 connects to an electrical load 4 that consumes power from the supply 3. A typical load is an electric vehicle 40, best seen in FIGS. 10A-10C. The electrical connection can be carried out with a cable, conductive rod, or an equivalent structure. However, this configuration can also be reversed so that the second part 2 connects to the electrical supply 3 and the first part 1 connects to the electric vehicle 40.

An electrical connection device forms the first part 1. The electrical connection device comprises an outer envelope 15, an electrical connector that is integrated in the outer envelope 15, and a guide surface 150 that is integrated into the outer envelope 15 and that encircles the front face of the electrical connector. In some embodiments, the electrical connection device is a single unitary piece.

The outer envelope 15 comprises an outer surface defining an inner volume that can incorporate any structure that is useful for the connection device's operation. Embodiments include those in which one housing forms the outer envelope 15 and those in which plural housings with appropriate forms form the outer envelope 15. In some embodiments, the outer envelope 15 is a cylinder whose height is low relative to its diameter. As such, the cylinder takes the form of a disk or a washer with a non-zero thickness.

Figure 17A:
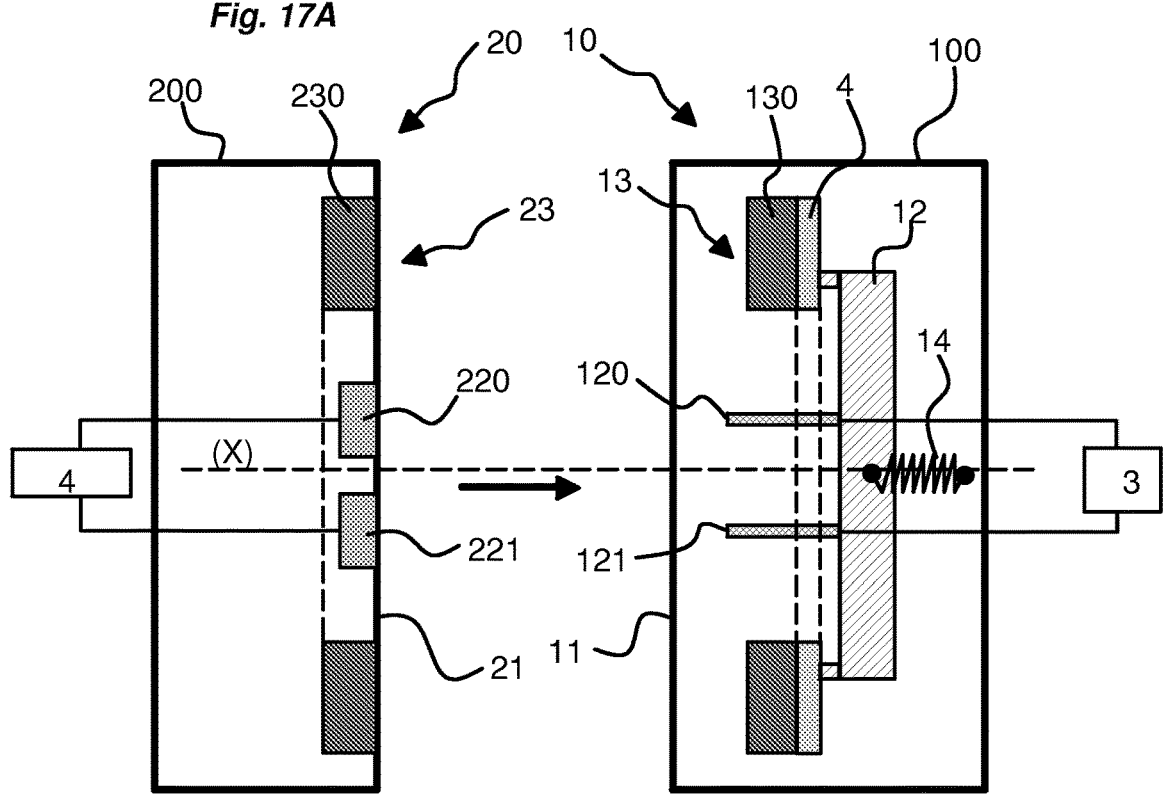
FIGS. 17A and 17B represent an example of an electrical connection assembly used in the electrical connection system, respectively in the disconnected position and in the connected position.
Figure 17B:
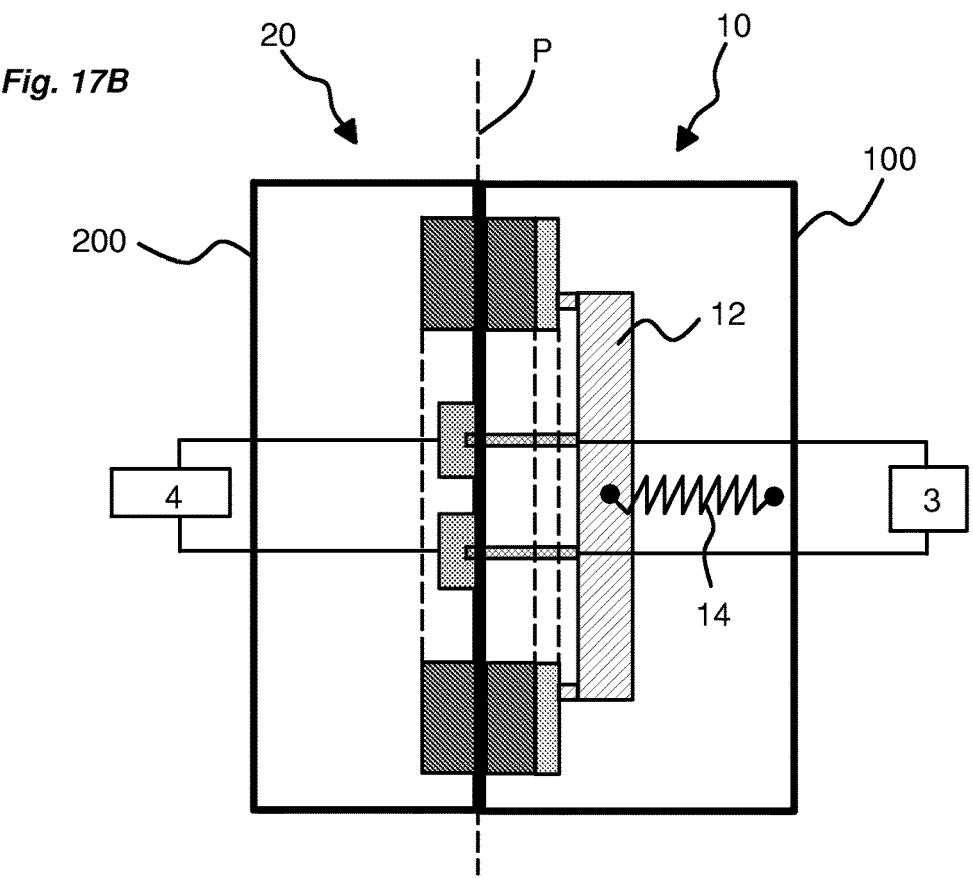

Jumping ahead to FIGS. 17A and 17B, the first part 1 has a first electrical connector 10 and the second part 2 has a second electrical connector 20. The first electrical connector's front face 11 abuts with the second electrical connector's front face 21 to form an electrical and mechanical connection as shown in FIG. 17B.

In the particular embodiment shown, the first connector's housing 100 has a front face 11, against which the second connector 20 can be placed. A suitable material for the first connector's housing 100 is plastic.

The first connector's housing 100 accommodates a mobile support 12, a first mobile magnetic part 13, and a spring 14.

The mobile support 12 has a pair of male contacts 120, 121 secured thereon. Corresponding conductive wires connect the male contacts 120, 121 to the electrical supply 3.

The first mobile magnetic part 13 moves with the mobile support 12. A magnetic force displaces the first mobile magnetic part 13 between a first position and a second position.

The spring 14, which is secured to the first connector's housing 100 and to the mobile support 12, brings the first magnetic part 13 into its first position when the magnetic effect necessary for the extraction is no longer great enough to overcome the spring's restoring force.

In its first position, the mobile support 12 retracts the male contacts 120, 121 into the interior of the first connector's housing 100, as shown in FIG. 17A.

In its second position, the mobile support 12 causes the male contacts 120, 121 to protrude outwards through a plane formed by the front face 11 and the mobile assembly formed by the support 12, as shown in FIG. 17B. In this second position, the first magnetic part 13 abuts a part of the housing 10.

The second connector's housing 200 has a front face 21 that is normal to an axis of revolution X. The second connector's front face 21 abuts the first connector's front face 11, thus defining the connection surface. For each connector 10, 20, the connection surface thus corresponds to the surface of contact with the other connector 20, 10 when a magnetic force joins the first and second connector 10, 20 to each other. Like the first connector's housing 100, a suitable material for the second connector's housing 200 is plastic.

The second connector 20 comprises two female contacts 220, 221, for example two electrical tracks flush on its front face 21. In some embodiments, the two electrical tracks define concentric circles. The female contacts 220, 221 come into electrical contact with the male contacts 120, 121 of the first connector 10.

The second connector 20 also comprises a second magnetic part 23, which is secured in the interior of the housing. The second magnetic part 23 attracts the first magnetic part 13 as the second connector 20 approaches the first connector 10. This promotes joining of the first and second connectors' housings 100, 200 against one another at their respective front faces 11, 21. This also promotes displacement of the mobile support 12 in the first housing and thus extraction of the male contacts 120, 121 so that they can connect to the female contacts 220, 221 of the second connector 20.

Depending on the form of the two front faces 11, 21, their connection surfaces can have different forms. In the particular embodiment shown, the front faces 11, 21 are substantially flat. However, in alternative embodiments, the front faces are hemispherical.

Either one or both the first and second magnetic parts 13, 23 comprises a source of magnetic field. In some embodiments, the source is a permanent magnet.

In the particular embodiments shown, the first magnetic part 13 happens to comprise a permanent magnet 130 with an annular form and the second magnetic part 23 happens to comprise a permanent magnet 230 with an annular form.

In the particular example shown in FIGS. 17A and 17B, the first connector's permanent magnet 130 is secured on a ferromagnetic part 4. The first connector's permanent magnet 130 and the second connector's permanent magnet 230 are positioned coaxially as the distance between the first and second connectors 10, 20 decreases. When the second connector 20 is opposite the first connector 10, the first and second connectors' permanent magnets 130, 230 are arranged such as each to have an air gap surface parallel to a joining plane P.

An alternative embodiment relies instead on an electromagnet arranged in the magnetic part of the first connector 10 or the second connector 20 to provide the magnetic attraction between the first and second connectors 10, 20.

Different magnetic architectures are possible. Among these are the magnetic architectures described in EP2628213A1, EP2667459A1, the contents of which are herein incorporated by reference.

The details of the magnetic architecture are not important but should result in the presence of a maximal magnetic flux between the first and second connectors' magnetic parts 13, 23 when the first and second connectors 10, 20 are in abutment and the decrease in this flux as the first and second connectors 10, 20 separate.

The electrical connection device also includes a guide. This guide can be a mechanical guide, a magnetic code, or a combination of both. The guide either guides the first connector 10 towards the second connector 20 or guides the second connector 20 towards the first connector 10. In doing so, the guide assists the ability of the first and second connectors 10, 20 to abut each other as a result of the magnetic attraction.

The guide is integrated into the outer envelope 15 and arranged around the connector integrated in the outer envelope 15. This assists the first and second connectors' ability to abut each other as a result of a magnetic field.

In some embodiments, the electrical connection device comprises a guide surface 150 arranged around the connection surface of its connector. On the basis of the architecture of the two connectors described above, this guide surface 150 extends around either one of the first or second connectors' front faces 11, 21. This promotes the ability to guide the first and second connectors' housings 100, 200 towards each other and thus promotes the ability of the two connectors 10, 20 to abut one another. This guide surface 150 can have any appropriate form.

The guide surface 150 thus defines a collar around the front face of the housing integral with the connector and is provided on the outer envelope 15. The guide surface 150 can have different forms. Embodiments include those in which the guide surface 150 is flat, those in which it is concave to form a receptacle, and those in which it is convex.

The guide surface 150 will preferably have a form that is symmetrical around the axis of revolution X or around a plane such that the connection surface is then positioned according to this axis of revolution X or according to a normal axis of this plane. In addition, guide surface 150 can have an outer edge with any form. Examples include an outer edge with four sides, such as a rectangle or square, and a circular outer edge. In the embodiments shown in the drawings, the guide surface 150 has a circular outer edge.

In addition, guide surface 150: is distinct from the front face of the connector, and therefore does not comprise any electrical contact; extends on the periphery of the front face of the connector integrated with the outer envelope 15, all around the connection surface; has a surface area larger than that of the front face of the connector; and extends the front face of the connector's housing continuously towards the exterior.

Among those embodiments in which it is concave are those in which the guide surface 150 defines an inverted cone with a truncated vertex leaving behind a small base. The integrated connector occupies this small base. In this configuration, the guide surface forms an angle with the axis of revolution X that is larger than 30° and smaller than 90°. The height of this cone depends on the particular application. Preferably, the cone's height is twice that of the integrated connector's housing.

It is useful for the guide surface 150 to have an area that is greater than that of the connector's connection surface. In a particular embodiment, the guide surface 150 has a surface area that is at least twice as large as that of the connector's connection surface.

The appended figures represent different embodiments of the device and of the electrical connection system as described herein.

In FIG. 1, the electrical connection device has a flat guide surface 150 around the connector's front face 11. The magnetic force attracts the second connector 20 towards the first connector 10.

Figure 2A:
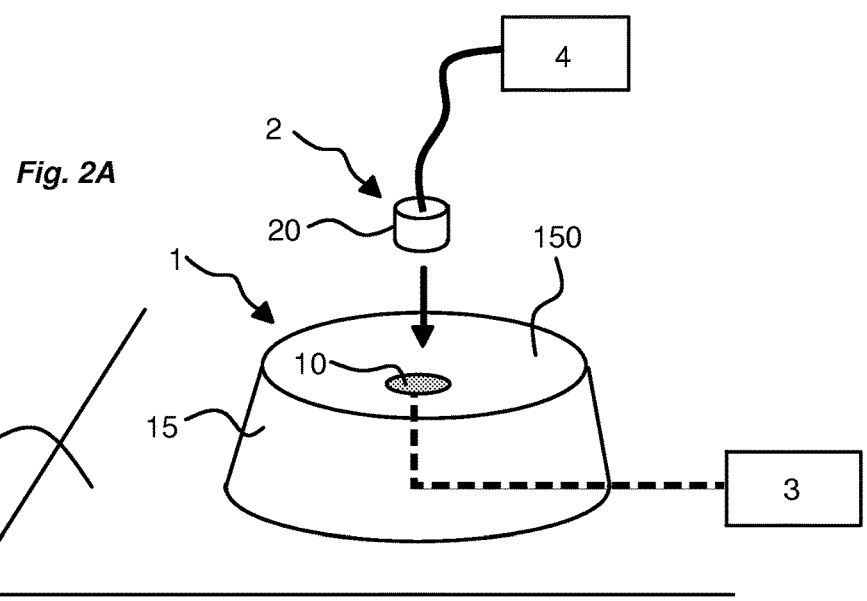
FIGS. 2A and 2B represent another embodiment of the electrical connection system.
Figure 2B:
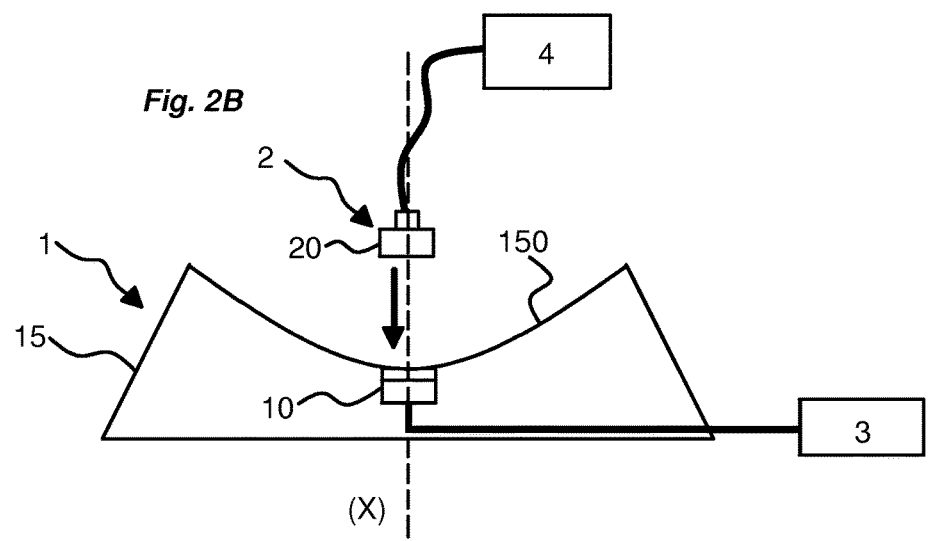

In FIGS. 2A and 2B, the outer envelope 15 defines a receptacle provided with a concave guide surface 150. The size of the receptacle, its depth, and in particular the surface and inclination of its guide surface 150 depend on the particular application.

Figure 10A:
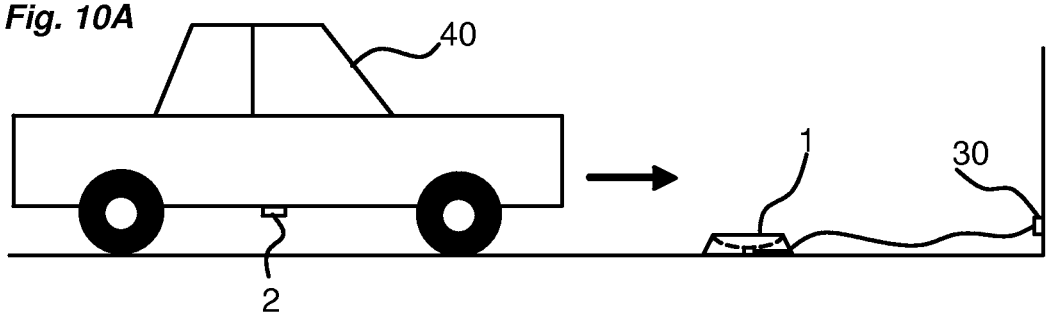
FIGS. 10A to 10C illustrate the operating principle of the system in accordance with the first embodiment.
Figure 10B:
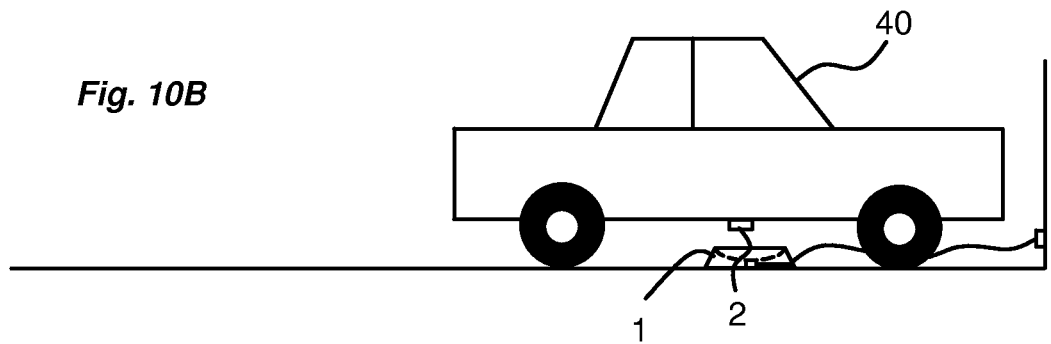
Figure 10C:
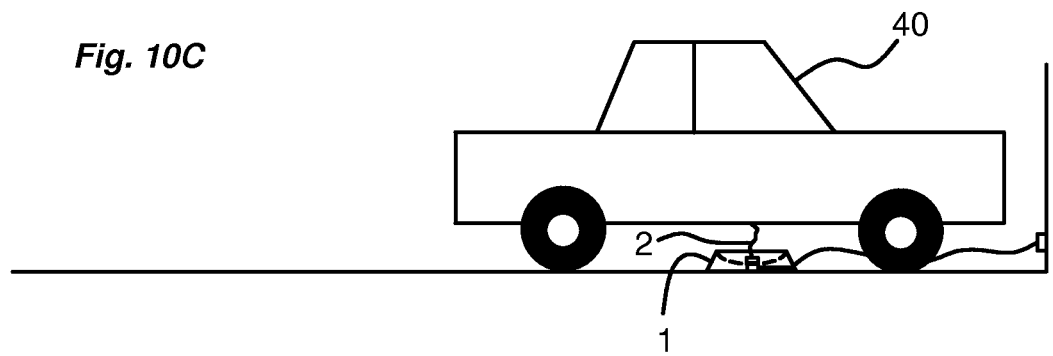

In an installation for recharging an electric vehicle 40, such as that shown in FIGS. 10A-10C, these parameters will be determined such as to obtain the mechanical and therefore electrical connection between the first connector 10 and the second connector 20, without requiring excessively precise positioning of the electric vehicle 40 in relation to the outer envelope 15 or of the outer envelope 15 in relation to the electric vehicle 40.

The outer envelope 15 thus has a widened form that defines the inner guide surface 150 with a concave form facing the second connector 20. Preferably, the outer envelope 15 has radial symmetry about an axis of revolution X that coincides with the direction of displacement of the second connector 20 towards the first connector 10.

A preferred embodiment integrates the first connector's housing 100 into the outer envelope 15 at the base of the concavity thus formed and preferably into the center of the concavity. The front face 11 of the first connector 10 thus presents itself to the outer envelope's base such as to be accessible to the electrical connection. In a preferred embodiment, the connection surface is perpendicular to the axis of revolution X.

The first connector's housing 100 can be integrated in the outer envelope 15 by any appropriate means. One way is to over-mold plastic between the outer envelope 15 and the first connector's housing 100. The guide surface 150 formed by the outer envelope 15 would thus extend around the first connector's housing 100.

A magnetic source provides the magnetic field that attracts the second connector 20 and the first connector 10 towards each other. In some embodiments, the source comprises individual sources whose individual fields sum together to form the necessary magnetic field. In such embodiments, the individual sources are distributed around the first connector's front face 11. These magnetic sources can be integrated in the outer envelope 15 or accommodated within the outer envelope 15. These magnetic source can be arranged on the guide surface 150 itself or accommodated below the guide surface 150. The use of multiple sources is particularly useful for a flat or convex guide surface 150.

Figure 3A:
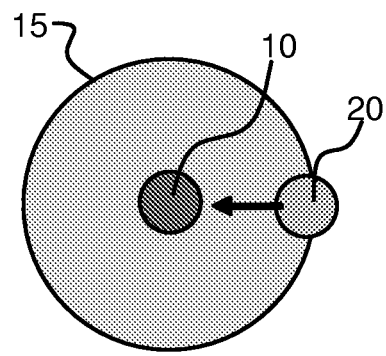
FIGS. 3A to 3C illustrate an operating principle of the magnetic means of the electrical connection device.
Figure 3A:
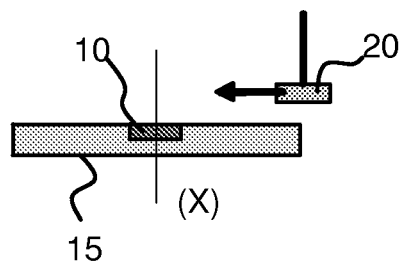
Figure 3B:
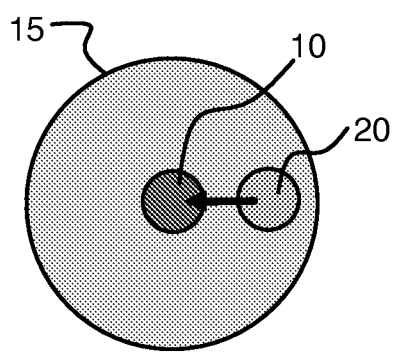
Figure 3B:
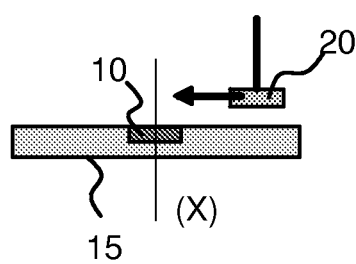
Figure 3C:
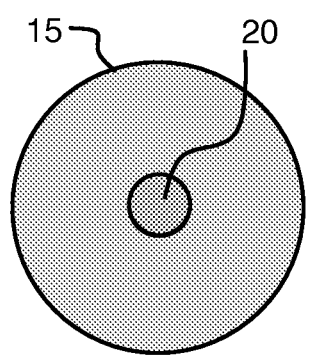
Figure 3C:
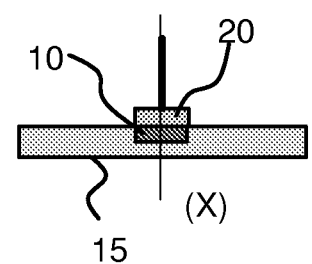

FIGS. 3A to 3C illustrate the coupling process between first and second connectors 10, 20.

In FIG. 3A, the second connector 20 is spaced from the first connector 10 but is at least partially plumb with the guide surface 150.

In FIG. 3B, the second connector 20 has been attracted slightly further towards the axis X and hence towards the waiting first connector 10. At this point, the magnetic interaction has grown stronger In FIG. 3C, the first and second connectors 10, 20 have become close enough so that the magnetic force takes over and causes the joining between the first and second connectors 10, 20. It is apparent therefore that all that is necessary is to bring the first and second connectors 10, 20 close enough to each other so that the magnetic field can consummate the connection.

Figure 4:
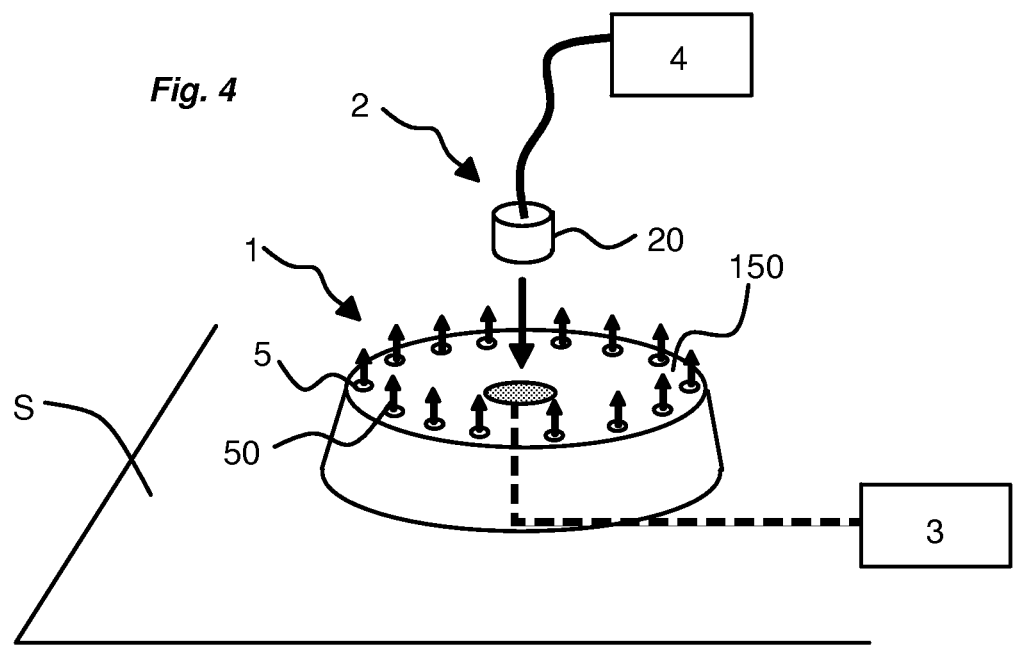
FIG. 4 represents another embodiment of the electrical connection system.

An alternative embodiment shown in FIG. 4 features permanent magnets 5 distributed around the first connector's housing 100 arranged in the interior of the outer envelope 15 or integrated into the guide surface 150. The distribution is such as to avoid conflict between the force of attraction towards the second connector 20 and any repulsive effects. In one embodiment, the permanent magnets 5 are arranged in an annular crown centered on the first connector 10. The crown's diameter is sufficient to permit guiding the second connector 20 towards the first connector 10, which in the case of a symmetrical guide surface 150, will be at the guide surface's center. Other embodiments feature magnets 5 arranged in a plurality of concentric annular crowns, all centered on the first connector 10.

In the embodiment shown in FIG. 4, each magnet 5 causes a repulsive field 50 whose polarity is the same as that of the second connector 20, thus exerting a repulsive force that moves the second connector 20 towards the first connector 10. In some embodiments, the repulsive fields 50 are parallel and of substantially identical amplitudes. In others, the repulsive fields 50 have different orientations and intensities selected to promote guiding the second connector 20 towards the first connector 10. Among these are embodiments in which the repulsion fields 50 from magnets 5 have intensities that increase with increasing distance from the first connector 10 so as to orient the second connector 20 towards the first connector 10.

The further embodiments shown in FIGS. 5-9 have magnetic sources that are controlled, either mechanically or electrically, to bring the second connector 20 towards the first connector 10. In some embodiments, the outer envelope 15 accommodates these magnetic sources.

Figure 5:
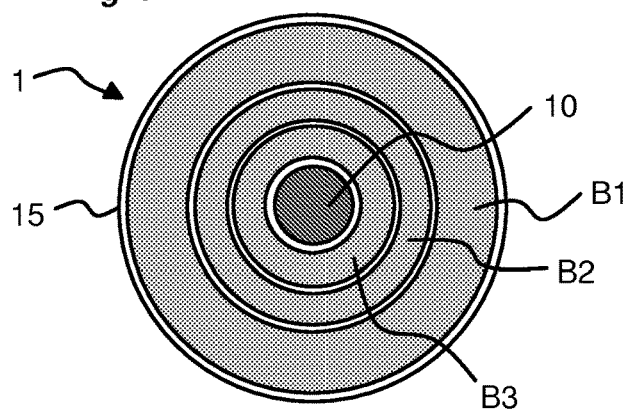
FIGS. 5 to 9 represent a plurality of embodiments of the electrical connection device.

Referring first to FIG. 5, the magnetic source takes the form of an outer coil B1, an intermediate coil B2, and an inner coil B3, all of which are electromagnetic coils that cause a magnetic field in response to current passing therethrough. In the illustrated embodiment, the electromagnetic coils B1, B2, B3 are annular coils that are concentric and centered on the first connector 10. Although the illustrated embodiment features three electromagnetic coils B1, B2, B3, there also exist embodiments that have only two electromagnetic coils and embodiments having four or more electromagnetic coils.

A controller controls the electromagnetic coils B1, B2, B3 based on a connection sequence. In a typical connection sequence, the controller applies power to one coil and then to another in sequence. The connection sequences can be adapted according to different parameters, in particular the number of coils used, the size of the device, the electromagnetic force generated by each coil in operation, and the operating environment of the device, among other things.

In a particular implementation, the connection sequence begins with activating the outer coil B1 to create a first axial magnetic field that causes a first displacement of the second connector 20 towards the axis of the device. The controller then activates the intermediate coil B2 and also deactivates the outer coil B1. The intermediate coil B2 creates a second axial magnetic field that continues to urge the second connector 20 towards the axis X. The controller then activates the inner coil B3, which is closest to the axis X, and deactivates the intermediate coil B2. The inner coil B3 creates a third axial magnetic field on which the second connector will be aligned.

In another implementation, the connection sequence begins with activating the outer coil B1 to a first axial magnetic field that displaces the second connector 20 towards the axis X. The sequence continues with activating the inner coil B3 and deactivating the outer coil B1. The inner coil B1 creates a second axial magnetic field that makes it possible to attract the second connector 20 directly towards the first connector. If activating the inner coil B3 forms a connection, the sequence ends. Otherwise, the sequence continues with activating the intermediate coil B2 and deactivating the inner coil B3 followed by again activating the inner coil B3 and deactivating the intermediate coil B2 to attract the second connector 20 to the first connector 10.

The magnetic attraction of the first connector 10 situated on the axis X makes it possible to ensure the final magnetic attraction in order to ensure the joining of the two connectors 10, 20.

In some embodiments, a microcontroller implements the controller. The controller executes the connection sequences and controls switches in response implements the controller. Each switch activates or deactivates a corresponding one of the coils B1, B2, B3. Preferably, a detector provides the controller with information indicative of the occurrence of a connection. A suitable detector is a set having one or more micro-switches.

In another embodiment, the controller executes an extraction sequence for disconnecting the first and second connectors. Such an extraction sequence includes activating the inner coil B3 with a current having an opposite polarity from that used during the connection sequence. The resulting magnetic field attracts the second connector 20 and thus disconnects it from the first connector 10. The intensity must be sufficient to counter the magnetic attraction field generated between the first and second connectors 10, 20.

Figure 6:
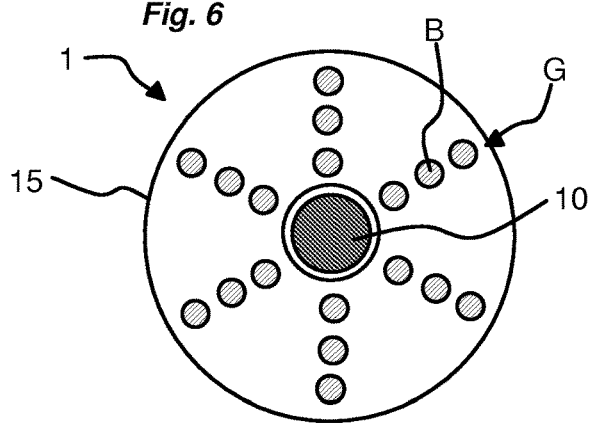

The embodiment shown in FIG. 6 has groups G of coils B. Each group G consists of coils B that are at different radial coordinates but the same angular coordinate. In the example shown, there are six groups G, each with three coils B. The connection sequences described above are applicable to the configuration shown in FIG. 6 by activating all coils with the same radial coordinate. In effect, the set of coils with the same radial coordinate is treated the same way as an annular coil in the embodiment of FIG. 5.

However, the embodiment shown in FIG. 6 provides additional flexibility since there are now two degrees of freedom. For example, a connection sequence can now include the step of activating only coils from one group G or a selection of groups G. This means that the resulting magnetic field is not restricted to having radial symmetry.

Figure 7:
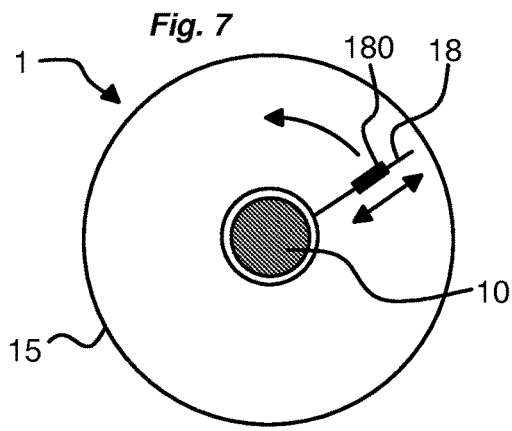
Figure 8:
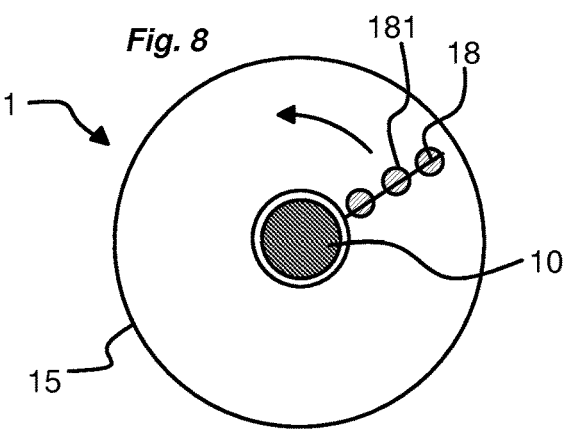
Figure 9:
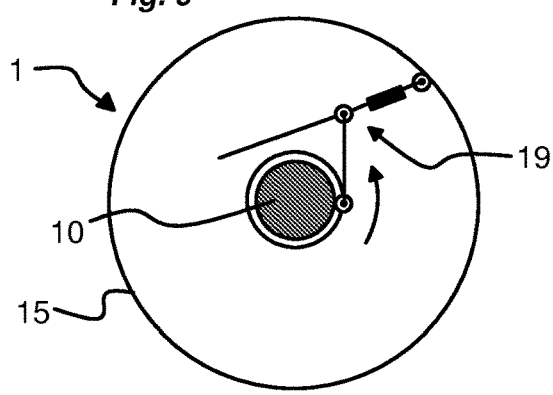

FIGS. 7 to 9 show implementations that mechanically activate magnetic sources within the outer envelope 15 and below the guide surface 150.

In the embodiment shown in FIGS. 7 and 8, a mechanical arm 18 supports one or more magnetic sources. The arm 18 can be activated to rotate around the axis X. This permits adjusting the angular coordinate of the magnetic source. In some embodiments, a slide mechanism on the arm 18 permits adjusting the radial coordinate of the magnetic source as well.

An alternative embodiment, shown in FIG. 9, features an articulated mechanism 19 having a first arm that can be pivoted pivoting around a fixed point at one end and a second arm that is connected by a slide connection to the first arm to rotate around the axis.

The magnetic source can be implemented as either one or more permanent magnets or one or more electromagnetic coils that are controlled according to the position of the second connector and/or according to connection or disconnection sequences executed by the controller. Some embodiments include a protector to protect the connector or the guide surface against dust or water. Examples of protectors include a diaphragm or a rotary or sliding cover. The protector can be activated at the approach of the second connector 20 and/or by the articulated mechanism 19.

In some embodiments, a magnetic plastic material forms the guide surface 150. As a result, the guide surface 150 naturally generates magnetic fields of appropriate magnitude and direction to guide the second connector 20 towards the first connector 10.

In general, by bringing the two parts opposite one another and by bringing the two connectors 10, 20 sufficiently close to one another thanks to mechanical guiding provided by the guide surface 150 and/or magnetic guiding provided by the magnetic source, the two connectors 10, 20 will be made to couple through the intervention of a magnetic field. Thus, different arrangements of the system are possible. Again in a non-limiting manner, by considering that the guide surface 150 is integrated in the first part 1 of the system, the different arrangements below are obtained.

In a first arrangement illustrated by FIGS. 1, 2A, 2B, the first part 1, which bears a guide surface 150 is placed on the ground S, and is preferably secured in the ground. The second part 2 is then brought close in order to be connected to the first part 10. The second connector 20, which is connected by a cable or another means to the load 4, is thus guided towards the first connector 10. At first, gravity guides the first connector 10. Then, when the first connector 10 is close enough, the guide surface 150 takes over. Eventually, the magnetic part 13 of the first connector 10 consummates the connection to the second connector 20.

Figure 11:
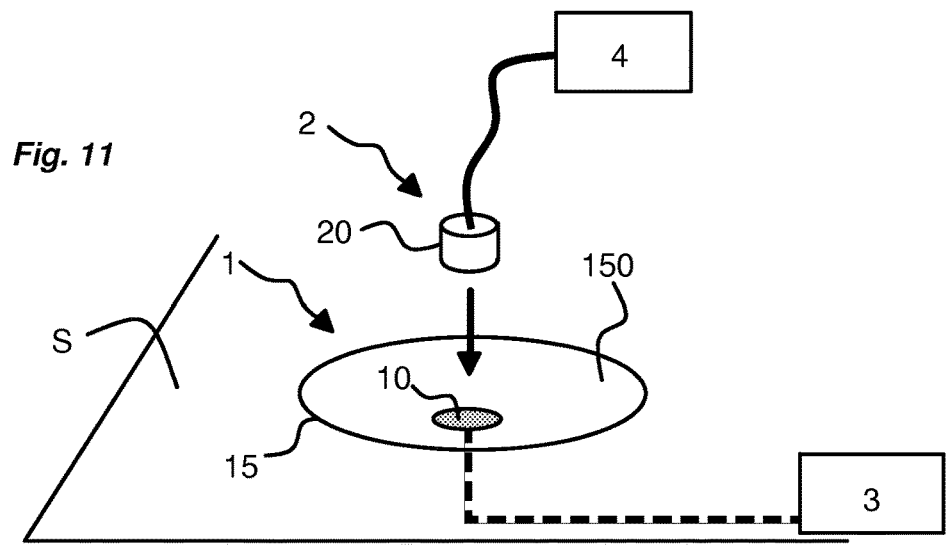
FIG. 11 represents an alternative arrangement of the electrical connection system.

In a second arrangement, the first part, which bears a guide surface, is integrated in the ground. With reference to FIG. 11, the first part 1 is thus at least partly embedded in the ground S. In a preferred embodiment, the first part 1 is completely embedded in the ground S such that the outer edge of the guide surface is flush with the plane formed by the ground S. The operating principle of this embodiment remains identical to that described above.

FIGS. 10A to 10C show the first and second parts 1, 2 being used at a recharging installation for supplying an electric vehicle 40 with power. The principle is described for a concave guide surface 150. However, the illustrated principle is the same regardless of the particular embodiment of the connection device and its placement relative to the ground S.

In FIG. 10A, the first part 1, which contains the first connector 10, rests on the ground of a parking space or a garage and connects to a power supply 4 via a wall socket 30. In the embodiment shown, the first part 1 is thin enough so that an electric vehicle 40 can be parked over it. In an alternative embodiment, the first part 1 is embedded in the ground S as described above in association with FIG. 11. In that case, there is no particular requirement to for the first part 1 to be thin.

The second part 2, which has the second connector 20, is mounted to an underside of the electric vehicle 40 and connects to the vehicle's battery.

FIG. 10B shows the electric vehicle 40 parked above the first part 1 so that the second connector 20 is essentially plumb with the first part 1. However, as a result of the guide surface 150, it is not necessary to position the second connector 20 directly above the first connector 10.

In FIG. 10C, the driver has issued a command to charge the battery. This releases the second connector 20, which is able to find its way to the first connector 10 thanks to the guide surface 150 and the magnetic field as described above. All that is necessary is to bring the second connector 20 in the vicinity of the first connector 10. The magnetic coupling will do the rest. In particular, the magnetic field will complete the mechanical and electrical coupling between the first and second connectors 10, 20.

In some embodiments, the vehicle 40 includes a winder system activated by a motor in the chassis to lower the second connector 20 for charging and to raise it again when charging is complete.

Figure 12A:
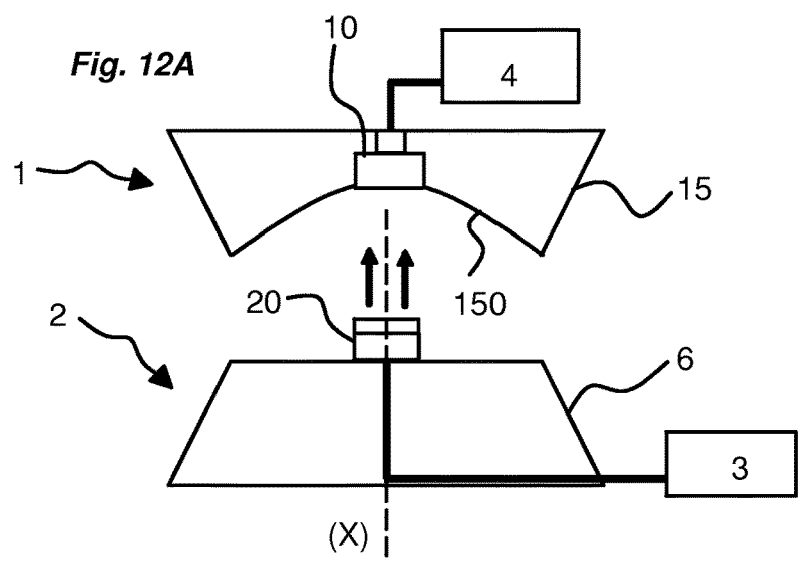
FIGS. 12A and 12B represent an alternative arrangement of the electrical connection system
Figure 12B:
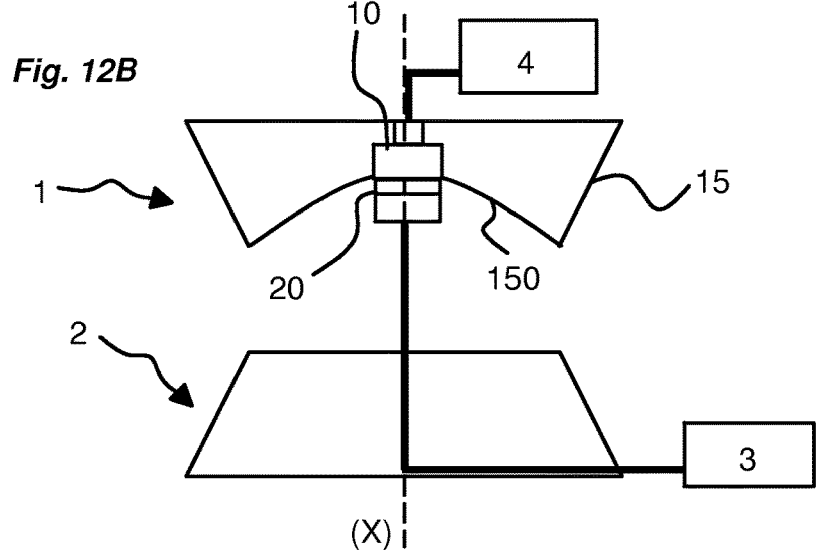

In the foregoing embodiment, the second connector can experience both radial and vertical motion during the connection process. In the embodiment shown in FIGS. 12A and 12B, the second connector 20 experiences primarily vertical motion. In this embodiment, the first and second connectors 10, 20 are brought close enough to one another for the second connector 20 to be guided by the guide surface 150 and then lifted towards the first connector 10 by the magnetic attraction between the magnetic parts 13, 23 of the respective first and second connectors 10, 20. Within the context of an installation for recharging an electric vehicle 40, this solution consists of parking the vehicle 40 to position the first connector 10 is above the second connector 20 and the guide surface 150 at a height that is sufficient so that the second connector 20 can be lifted upwards. In some embodiments, the second connector 20 is at the top of an appropriate support 6 or brought to this height by means of a lifting device.

In the embodiments described above in association with FIGS. 1 to 12B, the electrical connections between the electrical connection device and the wall socket 30 are formed by a standard electric cable. It is preferable that this cable be accommodated in a sheath that is secured on the ground or embedded. A winder can also be provided in the first part 1 to form a unit that can easily be transported and therefore easily moved.

Figure 13:
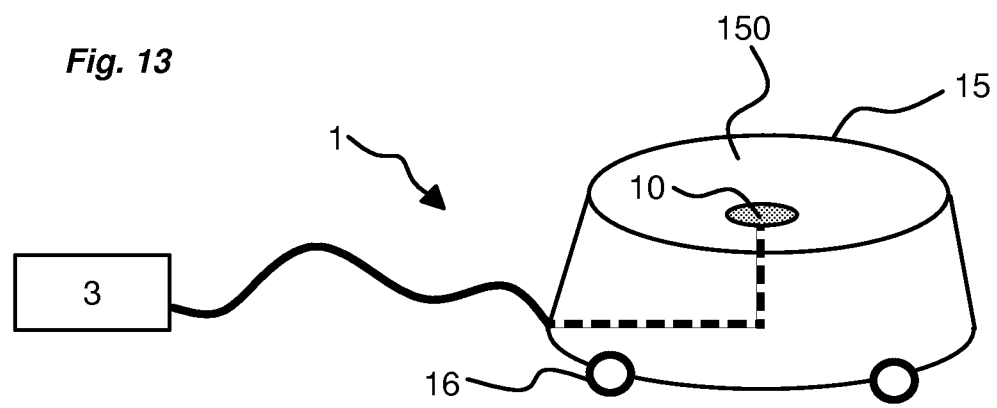
FIG. 13 represents another embodiment of the electrical connection system.

FIGS. 13-16 show embodiments in which the first connector 10 is mobile and hence can travel to the electric vehicle 40 rather than waiting for the electric vehicle 40 to park over it. FIG. 13 shows a self-propelled first part 1 having a motor that turns small wheels 16 to move the first part 1 towards the electric vehicle 40. Naturally, the first part 1 must have a way to find the electric vehicle 40. This is achieved by having a controller and a detector that detects a marker 41 on the electric vehicle 40 and that then controls the motor to cause the first part 1 to make its way to the correct location based in part on the marker 41. In some embodiments, the marker 41 emits a signal for detection by the detector.

Embodiments described thus far are those that have a concave guide surface 150. However, the embodiment described in FIGS. 12A and 12B does not depend significantly on the shape of the guide surface 150.

Figure 14A:
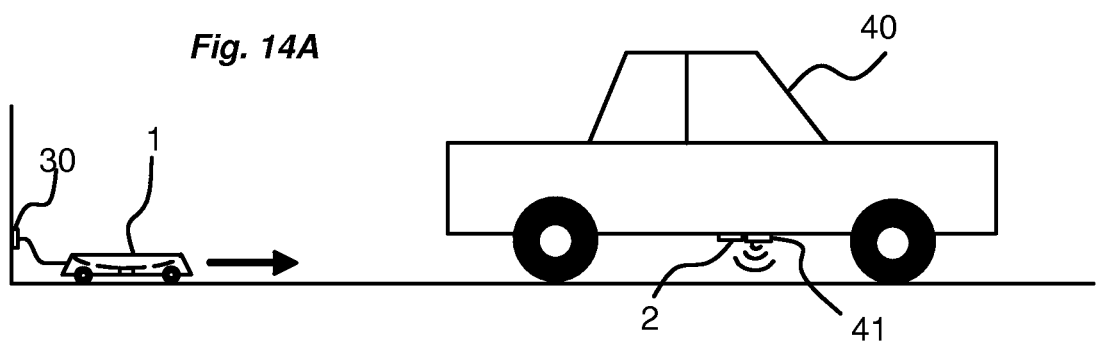
FIGS. 14A to 14C illustrate the operating principle of the system, represented in FIG. 13, in its application in an installation for recharging an electric vehicle.
Figure 14B:
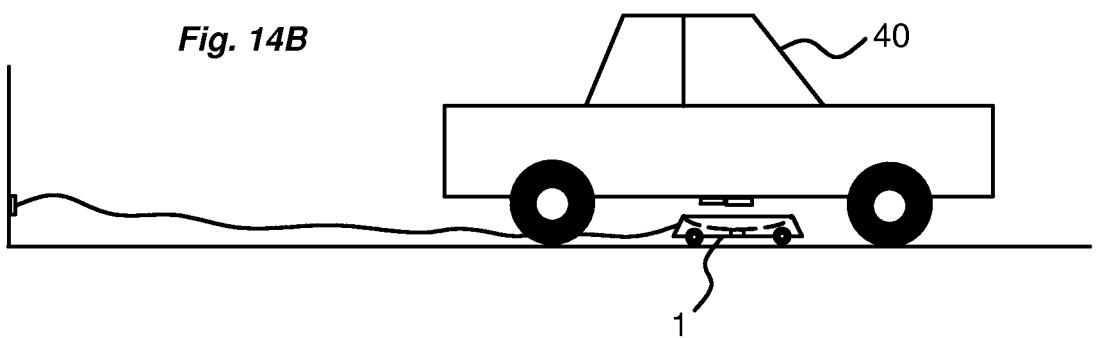
Figure 14C:
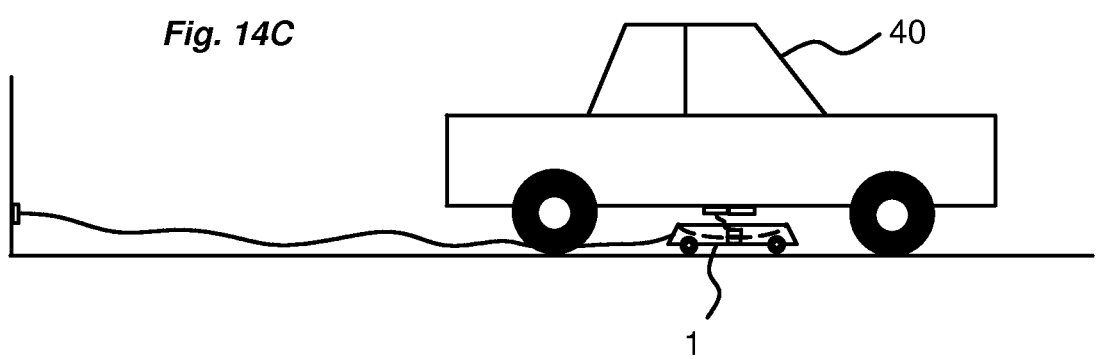

FIGS. 14A to 14C illustrate the operating principle of the system described above in association with FIG. 13, when it is used in an installation for recharging an electric vehicle 40.

In FIG. 14A, after the electric vehicle 40 has parked, the driver commands recharging of the vehicle. This activates the marker 41. The marker 41 then generates a signal to awaken the first part 1, which then seeks out the marker 41.

In FIG. 14B, the first part 1 has found the marker 41 and is now positioned under the second part 2 to await release of the second connector 20. The release can be initiated by the driver or automatically.

In FIG. 14C, the second connector 20 has been released and has found its way to the first connector 10 thanks to the guide surface and/or its magnetic guide means, which guides the second connector 20 to the first connector 10. The magnetic field, which is generated by the magnetic part 13 of the first connector 10, finishes attracting the second connector 20 towards the first connector 10, and makes it possible to complete the mechanical and electrical coupling between the second connector 20 and the first connector 10.

Figure 15:
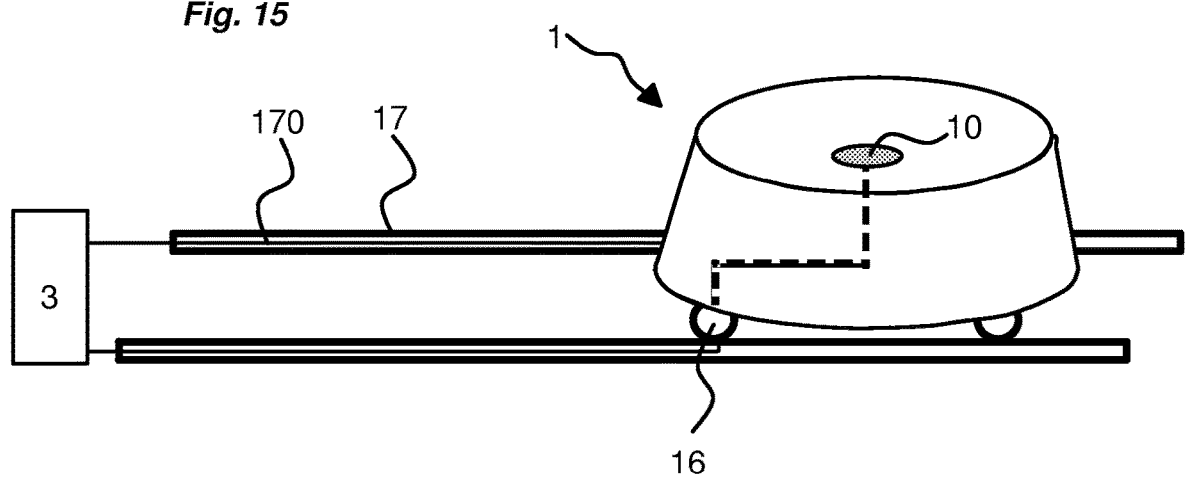
FIG. 15 represents another embodiment of the system.

FIG. 15 shows an embodiment in which the first part 1 rides on rails 17. The first part 1 can still include a detector to search for the marker 41. However, by reducing the number of degrees of freedom, the rails 17 make it possible to dispense with the marker 41 and the detector.

In some embodiments, a mechanical stop or a positioning system present in the vehicle 40 allows the vehicle 40 to be positioned correctly relative to the rails 17 so that the first part 1 can make its way to the vehicle 40. In some embodiments, a stop on the rails 17 stops the first part 1 at a determined position below the second part 2.

In FIG. 13, conductors 170 accommodated within one or more rails 17 provide a connection between a wall socket 30 and the first part 1 through a connector on or near the wheels. This avoids the need for wires between the socket 30 and the first part 1.

Figure 16:
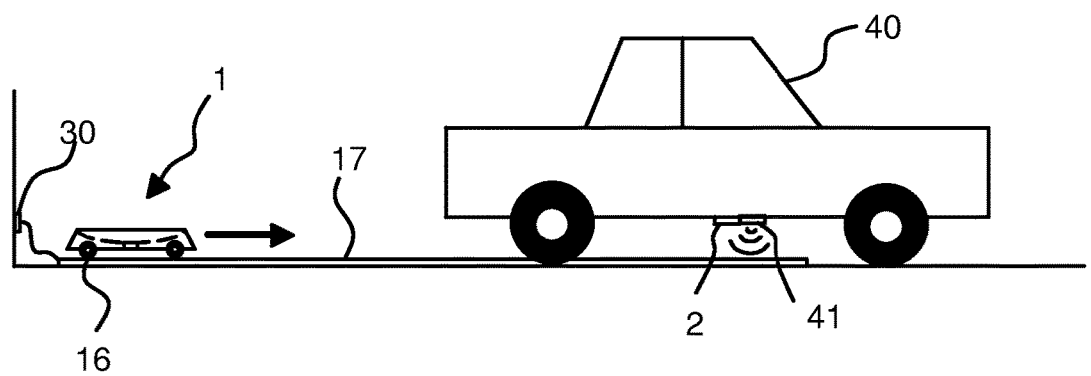
FIG. 16 illustrates the operating principle of the system represented in FIG. 15.

FIG. 16 illustrates the operating principle of the system for the configuration shown in FIG. 13. The two final connection steps are identical to those already described above.

In some embodiments, the first connector 10 and its housing 100 are in the form of an electric socket and the second connector 20 is in the form of a plug that connects the base. The second connector's housing 200, which forms the plug, has a form suitable for ease of connection to the base. When the first connector 10 is integrated in the outer envelope 15 to receive the plug and the first part 1 is on the ground, the second connector's housing 200 can have any form that allows it to be oriented towards the base. In some embodiments, the second connector's housing 200 has rounded parts on its lateral flanks to maintain instability when it on a support, and thus a capacity for being oriented around its axis.

The connector as described herein has numerous advantages. Among these are its ease of implementation. It can simply be placed on the ground. It also does not require complex human intervention to operate. Only a release of the plug may be necessary, for example in those embodiments that do not have an extraction sequence. The connector is inexpensive, particularly compared to those that rely on induction. Finally, there is no need for significant modifications to the electric vehicle 40.

Having described the invention, and a preferred embodiment thereof, what is new and secured by Letters Patent is:

1. An apparatus comprising an electrical connector, said electrical connector comprising a guide, an outer envelope, and a first connector integrated into said outer envelope, wherein said first connector comprises a front face, a first electrical connection unit, and a magnetic device, wherein said front face is on said outer envelope, wherein said first electrical connection unit is configured to connect to an electrical supply circuit, wherein said magnetic device magnetically attracts a second connector, wherein, as a result of said magnetic attraction, said second connector adheres against said front face of said first connector, wherein said magnetic device electrically connects said first electrical connection unit to a second electrical connection unit of said second connector, wherein said guide is integrated into said outer envelope, said guide being arranged around said front face, wherein said guide ensures guiding of said second connector toward said first connector to ensure magnetic joining of said first and second connectors, wherein said guide comprises a magnetic guide that comprises a magnetic-field source.

2. The apparatus of claim 1, wherein said guide comprises a guide surface that extends said front face radially outward.

3. The apparatus of claim 2, wherein said guide surface is concave, wherein said guide surface forms a receptacle, and wherein said first connector is integrated into a base of said receptacle.

4. The apparatus of claim 1, wherein said magnetic field source comprises an electromagnetic coil and wherein said outer envelope accommodates said electromagnetic coil.

5. The apparatus of claim 4, wherein said magnetic-field source comprises annular coils that are concentric with said first connector and wherein said apparatus further comprises a controller for controlling said annular coils.

6. The apparatus of claim 5, wherein said controller is configured to execute a control sequence that comprises successive steps of activation of said annular coils.

7. The apparatus of claim 4, further comprising a movable arm that supports said magnetic-field source, wherein said outer envelope accommodates said movable arm.

8. The apparatus of claim 1, wherein at least a portion of said outer envelope comprises magnetic plastic.

9. The apparatus of claim 1, further comprising a first part and a second part, wherein said electrical connector is a first electrical connector that is a constituent of said first part, wherein said first electrical connector is configured to connect to a source of electrical power, wherein said second part comprises a second electrical connector that is configured to connect to a load for consuming power provided by said source of electric power, and wherein said magnetic device attracts said second connector to electrically connect said first and second electrical connectors.

10. The apparatus of claim 9, wherein said first part is placed on the ground.

11. The apparatus of claim 9, wherein said first part is integrated into the ground.

12. The apparatus of claim 9, further comprising a support to raise one of said first and second parts relative to the ground.

13. The apparatus of claim 9, further comprising rails that cooperate with said wheels.

14. The apparatus of claim 13, further comprising electrical conductors, wherein said rails accommodate said conductors.

15. The apparatus of claim 9, wherein said first part comprises a controller and a detector connected to said controller for guiding said first part in movement towards an electric vehicle.

16. The apparatus of claim 9, further comprising a support that causes one of said first and second parts to be raised and then lowered relative to the ground.

17. The apparatus of claim 1, wherein said outer envelope comprises an outer surface that defines an inner volume.

18. The apparatus of claim 1, wherein said guide surrounds said front face.

19. The apparatus of claim 1, wherein said guide comprises a permanent magnet and wherein said outer envelope accommodates said permanent magnet.

20. The apparatus of claim 1, wherein said outer envelope surrounds said first connector and extends beyond said first connector's front face.

21. An apparatus comprising an electrical connector, said electrical connector comprising a guide, an outer envelope, and a first connector integrated into said outer envelope, wherein said first connector comprises a front face, a first electrical connection unit, and a magnetic device, wherein said front face is on said outer envelope, wherein said first electrical connection unit is configured to connect to an electrical supply circuit, wherein said magnetic device magnetically attracts a second connector, wherein, as a result of said magnetic attraction, said second connector adheres against said front face of said first connector, wherein said magnetic device electrically connects said first electrical connection unit to a second electrical connection unit of said second connector, wherein said guide is integrated into said outer envelope, said guide being arranged around said front face, wherein said guide ensures guiding of said second connector toward said first connector to ensure magnetic joining of said first and second connectors, and wherein said guide is selected from the group consisting of a mechanical guide and a magnetic guide, wherein said outer envelope forms a guide surface of said guide, said guide surface being distinct from said front face, and wherein said guide surface has a surface area larger than that of said front face of said first connector and extends away from said front face.

* * * * *